(12) United States Patent
Parks et al.

(10) Patent No.: US 9,192,258 B2
(45) Date of Patent: Nov. 24, 2015

(54) SERVING UTENSILS

(71) Applicants: Jon Parks, Moreno Valley, CA (US); Sherry Parks, Moreno Valley, CA (US)

(72) Inventors: Jon Parks, Moreno Valley, CA (US); Sherry Parks, Moreno Valley, CA (US)

( * ) Notice: Subject to any disclaimer, the term of this patent is extended or adjusted under 35 U.S.C. 154(b) by 0 days.

(21) Appl. No.: 14/664,021

(22) Filed: Mar. 20, 2015

(65) Prior Publication Data
US 2015/0265081 A1 Sep. 24, 2015

Related U.S. Application Data

(60) Provisional application No. 61/969,246, filed on Mar. 23, 2014.

(51) Int. Cl.
*A47G 21/10* (2006.01)
*A47G 21/04* (2006.01)
*A47J 43/28* (2006.01)
*A47G 21/02* (2006.01)
*B26B 3/02* (2006.01)
*B26B 29/02* (2006.01)

(52) U.S. Cl.
CPC .............. *A47G 21/04* (2013.01); *A47G 21/023* (2013.01); *A47G 21/10* (2013.01); *A47J 43/283* (2013.01); *B26B 3/02* (2013.01); *B26B 29/02* (2013.01)

(58) Field of Classification Search
CPC ..... A47G 21/023; A47G 21/04; A47G 21/10; A47J 43/28; A47J 43/281; A47J 43/282; A47J 43/283; B25B 9/02; B26B 3/02; B26B 29/02

USPC ............ 294/99.2, 131; 30/323, 326, 327, 328
See application file for complete search history.

(56) References Cited

U.S. PATENT DOCUMENTS

| | | | |
|---|---|---|---|
| 254,631 A * | 3/1882 | Fisher | 7/127 |
| 830,016 A | 9/1906 | Sims | |
| 985,755 A * | 2/1911 | Gilbert | 294/99.2 |
| 993,720 A * | 5/1911 | Schneider | 294/25 |
| 3,858,320 A | 1/1975 | Neal et al. | |
| 4,103,420 A | 8/1978 | Davis | |
| 4,261,608 A * | 4/1981 | Bradshaw | 294/25 |
| 4,286,514 A * | 9/1981 | Wilson | 100/211 |
| 4,768,288 A | 9/1988 | Culbertson | |
| 4,877,280 A * | 10/1989 | Milano | 294/99.2 |
| 5,447,351 A | 9/1995 | Klunder | |
| 6,129,398 A * | 10/2000 | Calhoun | 294/99.2 |
| 6,131,977 A | 10/2000 | Sacks et al. | |
| 8,328,253 B2 | 12/2012 | Wales | |
| 8,544,913 B2 | 10/2013 | Janocha | |
| 2004/0051327 A1* | 3/2004 | Yoon | 294/99.2 |

* cited by examiner

*Primary Examiner* — Dean Kramer
(74) *Attorney, Agent, or Firm* — Heidi Eisenhut; Loza & Loza, LLP

(57) ABSTRACT

A new and improved serving utensil is provided. The serving utensil may include a pair of elongated arms integrally formed together, or joined together by a hinge. Each elongated arm may comprise an elongated member, having an upper edge and an opposing lower edge, integrally connected to a gripping portion at its distal end and handle portions extending upwardly from the elongated member and having a concave or curvilinear shape. The serving utensil may further include a pair of guard members integrally connected to, and extending perpendicularly outward from, the pair of elongated arms.

18 Claims, 14 Drawing Sheets

SERVING UTENSILS

CLAIM OF PRIORITY UNDER 35 U.S.C. §119

The present Application for patent claims priority to U.S. Provisional Application No. 61/969,246 entitled "SERVING UTENSILS", filed Mar. 23, 2014, and hereby expressly incorporated by reference herein.

FIELD

The present invention generally relates to implements for handling food, and more particularly to spoons, forks and tong-type utensils having means for keeping hands of a user from coming into direct contact with food in a serving container.

BACKGROUND

When serving food, such as at a buffet or salad bar, various implements or serving utensils for handling food are utilized to grasp or collect a portion of food and prevent the hand of a user from coming into contact with and contaminating the food being served. Furthermore, although traditional serving utensils should prevent the food from being contaminated by dirty hands, more often than not the serving utensils are often placed by the user inside the serving container on top of the food causing the serving utensils to become covered with the food in the serving container. As a result, any dirt, germs, bacteria, etc. transferred onto the serving utensils by the hands of the user, or by any other means, contaminates the food in the serving container.

Additionally, with conventional serving utensils, there is no protection against the hand of a user becoming immersed in the contents of the serving container while the user is grasping or collecting the food in the serving container. As a result, any dirt, germs, bacteria, etc. on the hand of the user may be transferred directly to the contents of the serving container. Furthermore, the hand of the user becomes soiled with the contents of the serving container.

In view of the foregoing, what is needed are serving utensils that avoid these drawbacks and have a guard or shield which prevents the hand of a user from becoming soiled, as well as prevents the hand of the user from contaminating the contents of the serving container.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one aspect, a serving utensil having two elongated arms is provided. The serving utensil may comprise a first elongated arm including a first elongated member, having a first proximal end and a first distal end, a first gripping portion connected to the first distal end of the first elongated member and a first handle portion extending upwardly from the first distal end of the first elongated member; a second elongated arm including a second elongated member, having a second proximal end and a second distal end, a second gripping portion connected to the second distal end of the second elongated member and a second handle portion extending upwardly from the second distal end of the second elongated member; a first guard member integrally connected to, and extending perpendicularly outward from, the first elongated member below the first handle portion; and a second guard member integrally connected to, and extending perpendicularly outward from, the second elongated member below the second handle portion. The first distal end of the first elongated member may be integrally connected to the second distal end of the second elongated member forming a hinge member allowing the first elongated arm and the second elongated arm to be operable between a first, open position and a second, closed position.

According to one feature, the first handle portion and the second handle portion may each have a curvilinear shape.

According to another feature, the first handle portion may be a mirror image of the second handle portion.

According to yet another feature, the hinge member may extend downwards below the first and second elongated members.

According to yet another feature, the first elongated member may include an upper edge and an opposing lower edge. The upper edge of the first elongated member may be linear and the lower edge of the first elongated member may be linear from a first point to a second point and concave from the second point to a third point.

According to yet another feature, the second elongated member may include an upper edge and an opposing lower edge. The upper edge of the second elongated member may be linear and the lower edge of the second elongated member may be linear from a first point to a second point and concave from the second point to a third point.

According to yet another feature, the first and second gripping portions may be circular in shape having a scalloped outer edge.

According to yet another feature, the first and second guard members may have a triangular shape.

According to yet another feature, first and second elongated members may be made of a material selected from at least one of plastic, metal and carbon fiber.

According to another aspect, a serving utensil having a single elongated arm is provided. The serving utensil may comprise an elongated arm including an elongated member, having a proximal end and a distal end, a serving portion connected to the distal end of the elongated member and a handle extending upwardly from the distal end of the elongated member; a first guard member integrally connected to, and extending perpendicularly outward from, a first side of the elongated member; and a second guard member integrally connected to, and extending perpendicularly outward from, a second side of the elongated member.

According to one feature, the handle of the serving utensil may comprise a base handle portion extending perpendicularly upward from the elongated member; a first arm member extending outwardly and upwardly from a first side of the base handle portion; and a second arm member extending outwardly and upwardly from a second side of the base handle portion.

According to yet another feature, the first arm member and the second arm member may have a curvilinear shape.

According to yet another feature, the first arm member may be a mirror image of the second arm member.

According to yet another feature, the first arm member may be integrally formed into the second arm member forming a single component.

According to yet another feature, the serving utensil may further comprise an attachment member extending downwardly from the first and second guard members at the proximal end of the elongated arm.

According to yet another feature, the first and second guard members may have a triangular shape.

According to yet another feature, the first guard member may be a mirror image of the second guard member.

According to yet another feature, the serving portion may be a spoon.

According to yet another feature, the serving portion may be selected from at least one of a fork, knife and spatula.

According to yet another feature, the elongated member may be made of a material selected from at least one of plastic, metal and carbon fiber.

DETAILED DESCRIPTION

The following detailed description is of the best currently contemplated modes of carrying out the invention. The description is not to be taken in a limiting sense, but is made merely for the purpose of illustrating the general principles of the invention. Furthermore, in the following description, specific details are given to provide a thorough understanding of the embodiments. However, it will be understood by one of ordinary skill in the art that the embodiments may be practiced without these specific details.

Overview

According to one aspect, a serving utensil is provided. The serving utensil may include a pair of elongated arms integrally formed together, or joined together by a hinge means. Each elongated arm may comprise an elongated member, having an upper edge and an opposing lower edge, integrally connected to a gripping portion at its distal end and handle portions extending upwardly from the elongated member and having a concave or curvilinear shape. The serving utensil may further include a pair of guard members integrally connected to, and extending perpendicularly outward from, the pair of elongated arms.

According to another aspect, the serving utensil may provide for minimal touch points, three (3) for example, on the underside of the serving utensil which results in a reduced amount of food collecting on the utensil providing a more desirable appearance for continued use.

According to yet another aspect, the serving utensil may provide for a significant reduction of the spread of bacteria and germs found on the human hand to food by minimizing direct contact of the portion of the serving utensil that is held by the user by incorporating a guard member on either side of the handle portion of the serving utensil. The guard members also raise the handle portion in relationship to the portion used to grasp/collect the food. As a result of the guard members, when the serving utensil is set down on its side, the handle portions are in an angled resting position. Thus, when the serving utensil is tipped or moved from side to side, the surfaces of the serving utensil that have been touched by the hand of a user stay removed from direct food contact.

According to yet another aspect, the handle portions of the serving utensil provide not only ease in usage, but also draws the user to grasp onto this part of the serving utensil and less likely to attempt to hold on by the outer most edges that may come into contact with the food.

Serving Utensils—Two Elongated Arms

Figure 1:
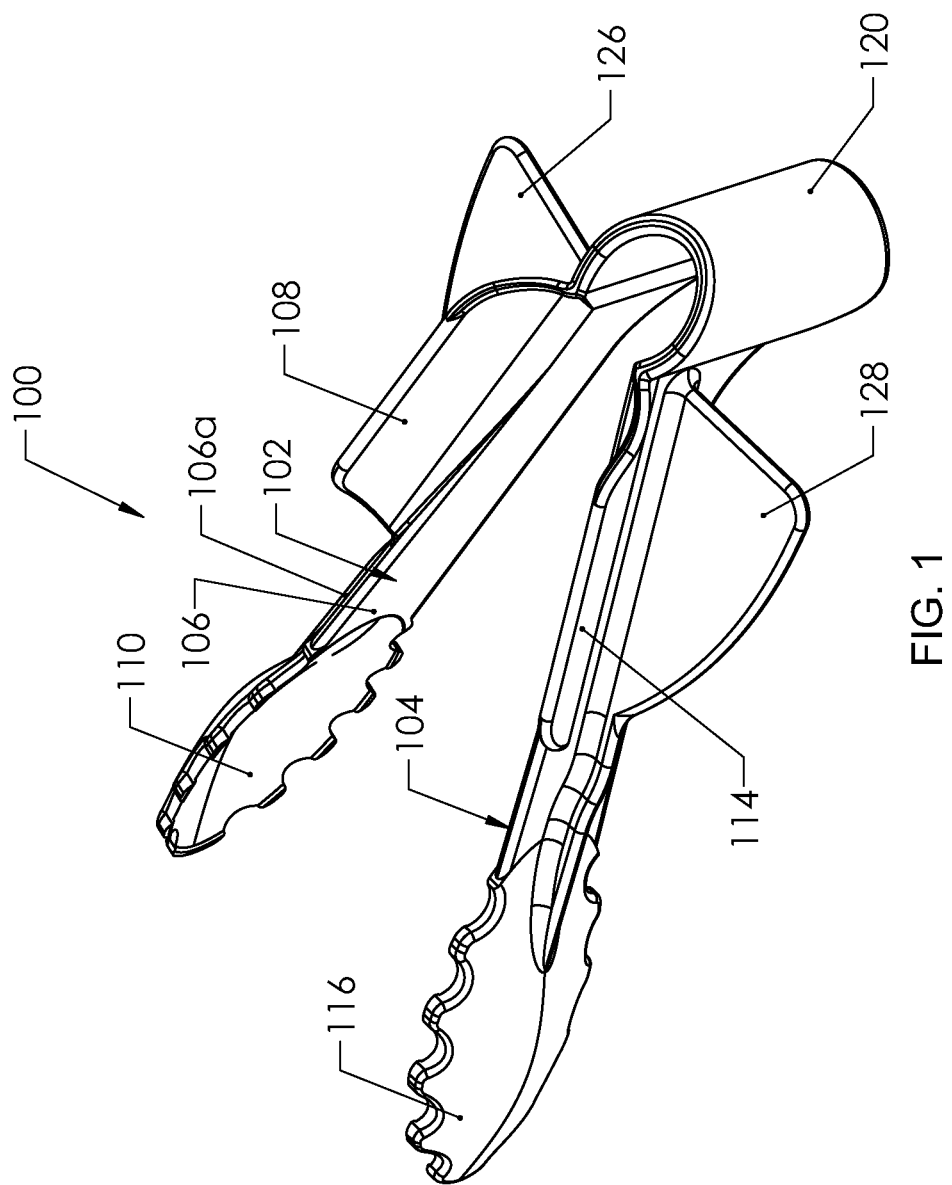
FIG. 1 illustrates a top left side perspective view of a serving utensil in an open position, according to one embodiment.
Figure 2:
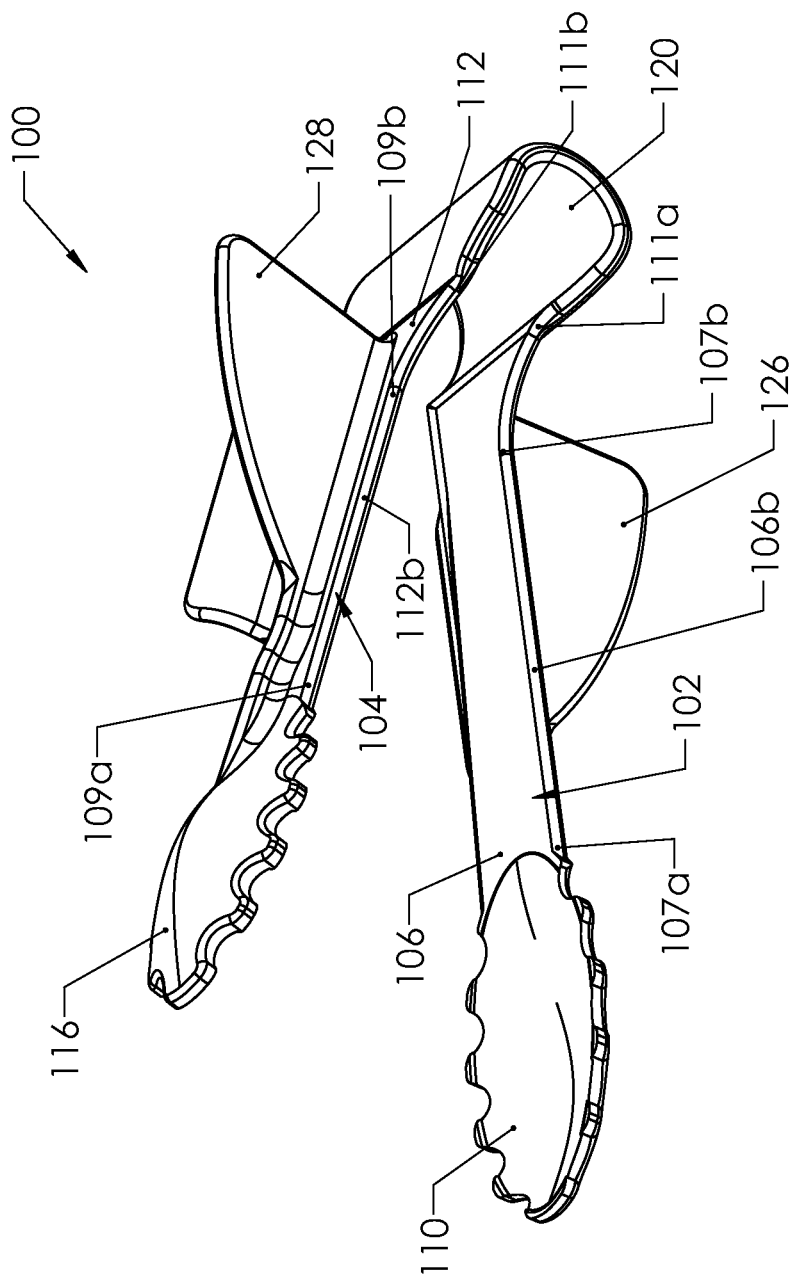
FIG. 2 illustrates a bottom left side perspective view of the serving utensil of FIG. 1.
Figure 3:
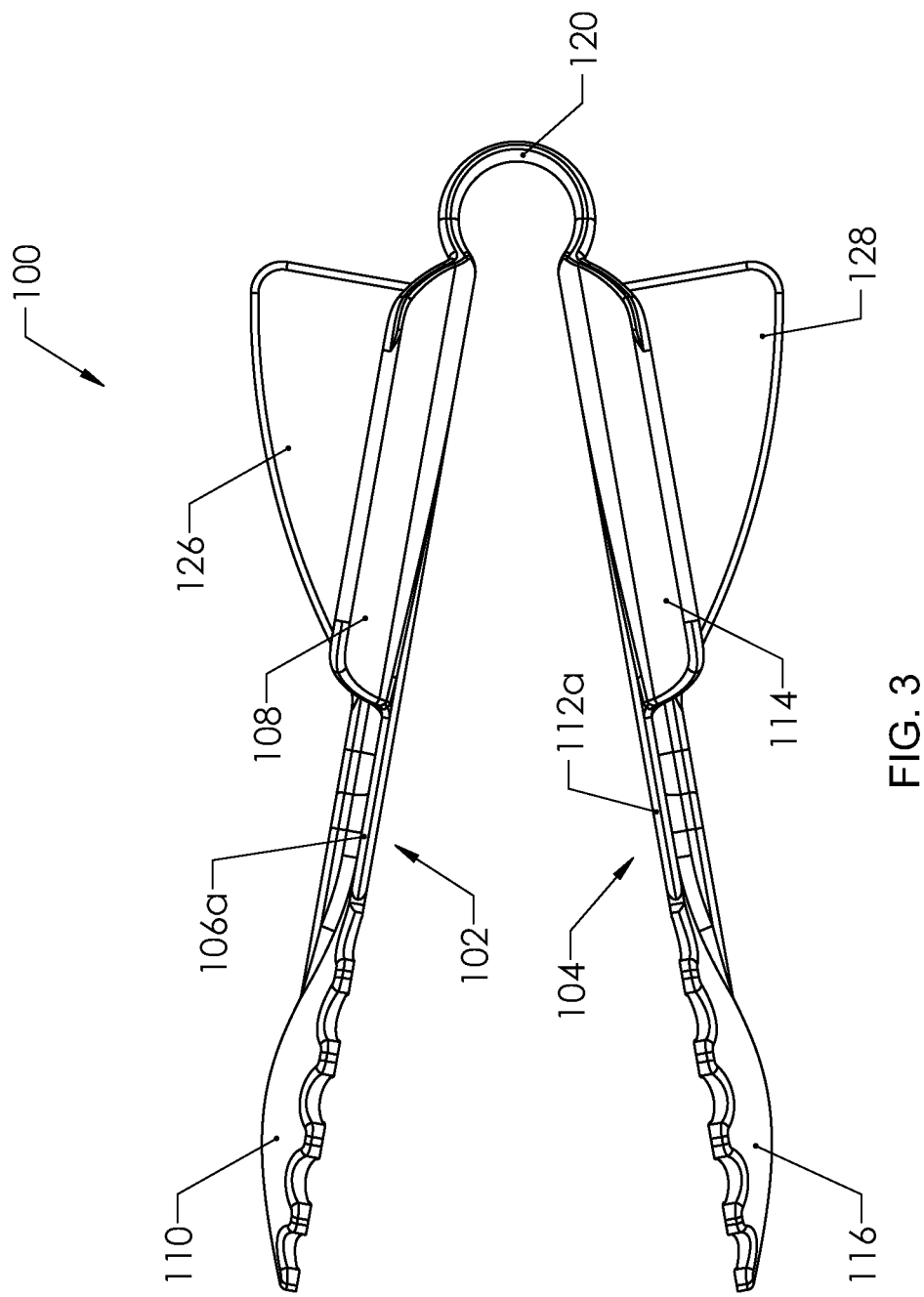
FIG. 3 illustrates a top elevation view of the serving utensil of FIG. 1.
Figure 4:
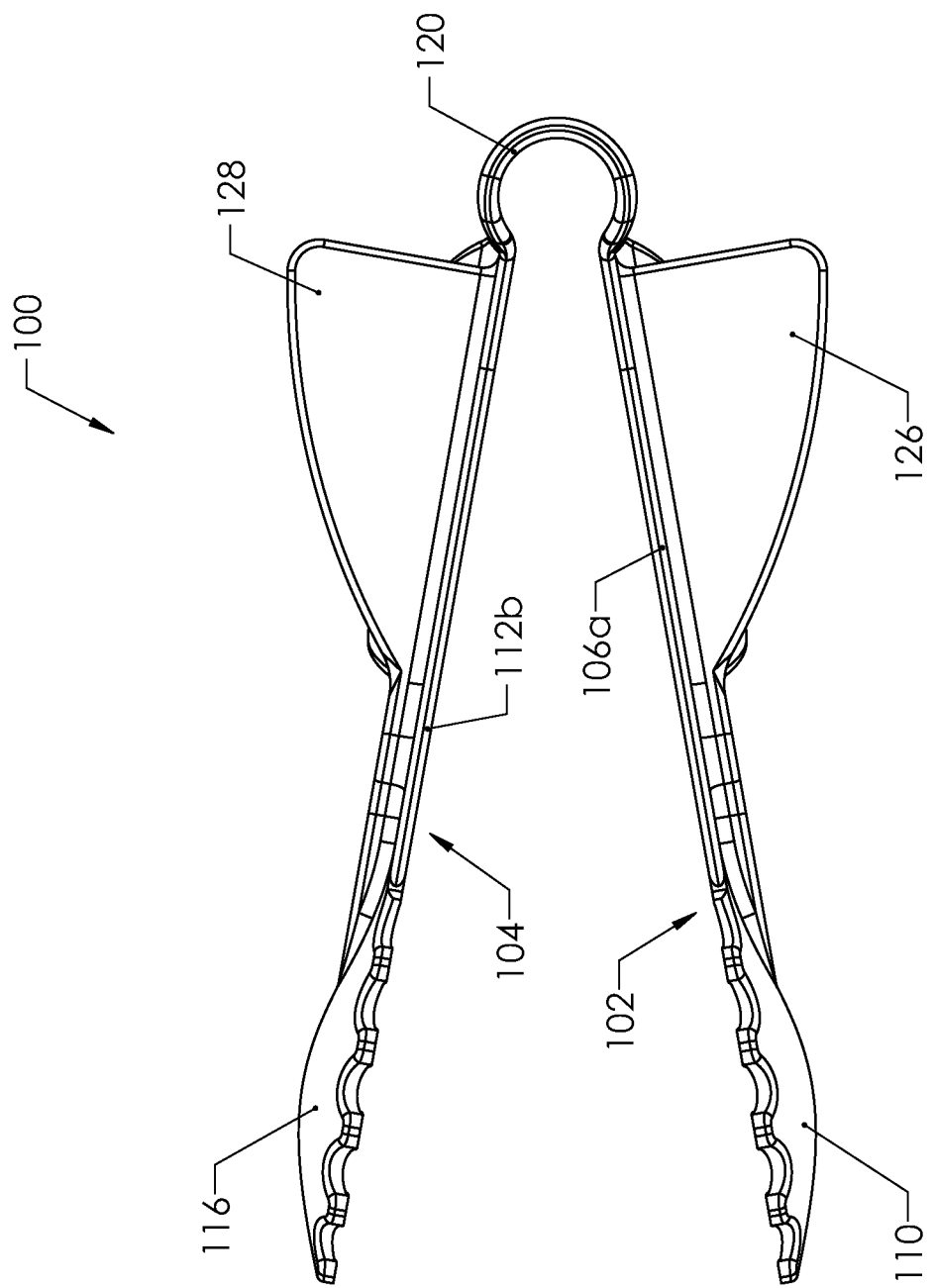
FIG. 4 illustrates a bottom elevation view of the serving utensil of FIG. 1.
Figure 5:
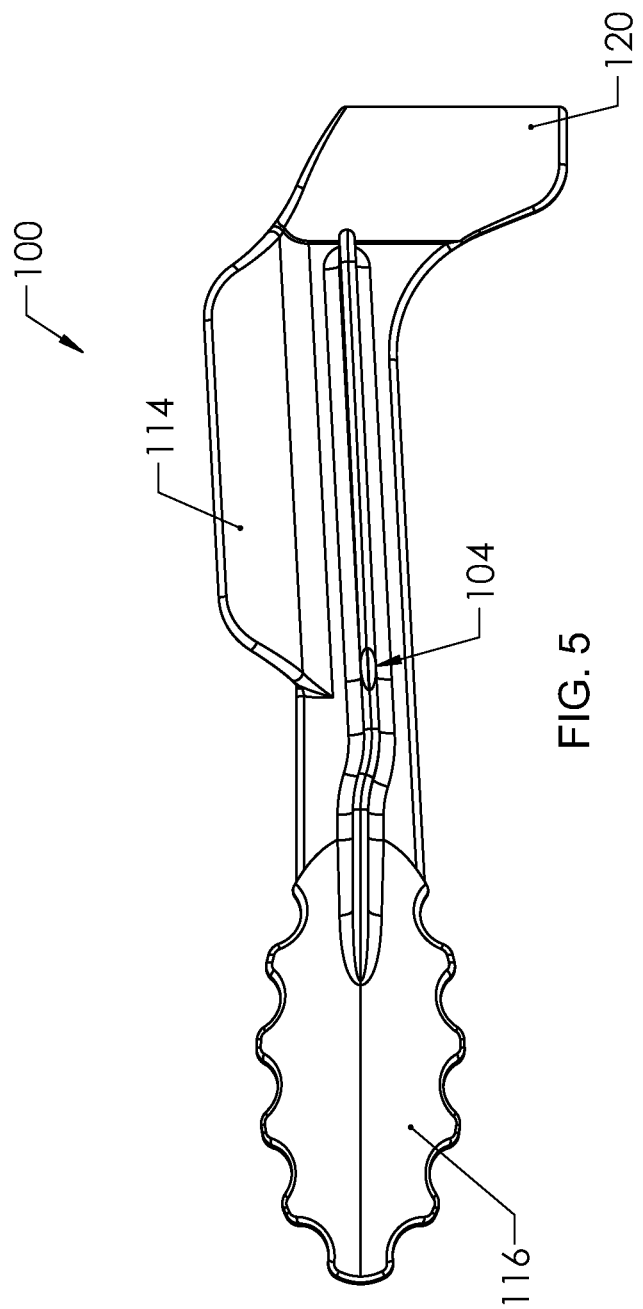
FIG. 5 illustrates a left side elevation view of the serving utensil of FIG. 1.
Figure 6:
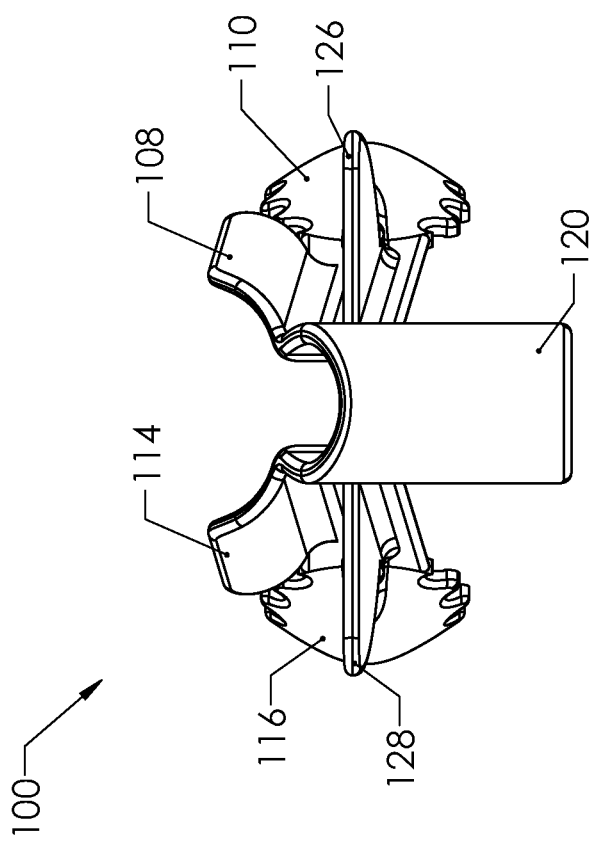
FIG. 6 illustrates a rear elevation view of the serving utensil of FIG. 1.
Figure 7:
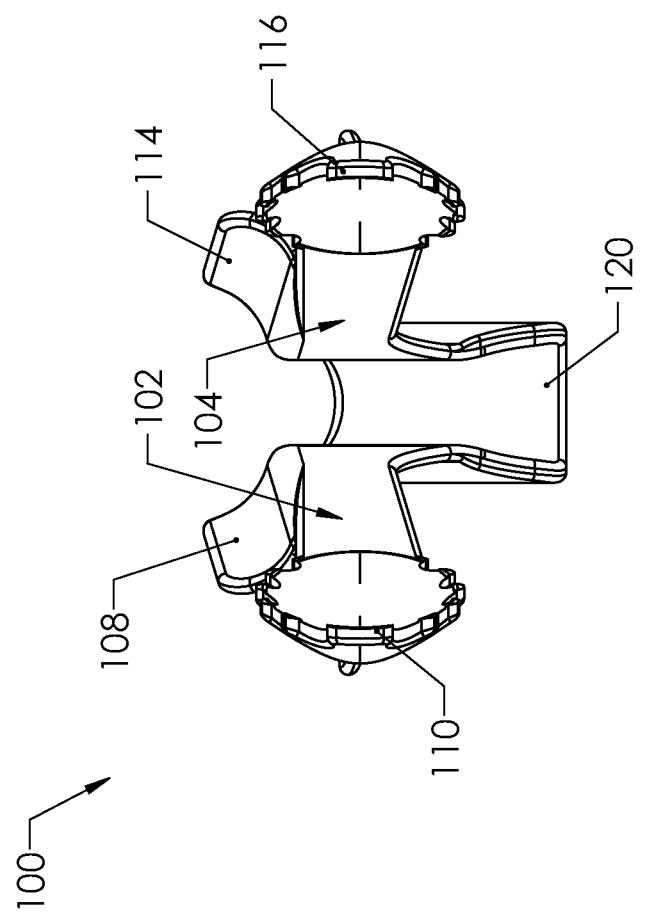
FIG. 7 illustrates a front elevation view of the serving utensil of FIG. 1.

FIG. 1 illustrates a top left side perspective view of a serving utensil in an open position, according to one embodiment. FIG. 2 illustrates a bottom left side perspective view of the serving utensil of FIG. 1. FIG. 3 illustrates a top elevation view of the serving utensil of FIG. 1. FIG. 4 illustrates a bottom elevation view of the serving utensil of FIG. 1. FIG. 5 illustrates a left side elevation view of the serving utensil of FIG. 1. FIG. 6 illustrates a rear elevation view of the serving utensil of FIG. 1. FIG. 7 illustrates a front elevation view of the serving utensil of FIG. 1. The following discussion refers interchangeably to FIGS. 1-7.

As shown, the serving utensil 100 may include a first elongated arm 102, having a proximal end and an opposing distal end, and a second elongated arm 104, having a proximal end and an opposing distal end. The proximal ends may be integrally formed together, or may be joined together, by a hinge means 120 allowing the first elongated arm 102 and the second elongated arm 104 to be operable between a first, open position and a second, closed position. The first elongated arm 102 and the second elongated arm 104 may be biased to the open position. According to one aspect, the hinge means 120 may have a generally oval or curvilinear configuration and is integrally connected to the proximal ends of the first and second elongated arms 102, 104. The hinge means 120 may extend downwards past the first and second elongated arms 102, 104 and may be used to engage with an outer edge of a serving container.

The first elongated arm 102 may comprise a first elongated member 106, having an upper edge 106a and an opposing lower edge 106b, integrally connected to a first gripping portion 110 at its distal end and a first handle portion 108 extending upwardly from the first elongated member 106 and having a concave or curvilinear shape. The second elongated arm 104 may comprise a second elongated member 112, having an upper edge 112a and an opposing lower edge 112b, integrally connected to a second gripping portion 116 at its distal end and a second handle portion 114 extending upwardly from the second elongated member 112 and having a concaved or curvilinear shape. The upper edges 106a, 112a of the first and second elongated members 106, 112 may have a generally linear shape and extend from the first and second gripping portions 110, 116, respectively, to the hinge means 120. The lower edges 106b, 112b may have a generally linear shape from first points 107a, 109a on the first and second elongated members 106, 112, respectively, to second points 107b, 109b on the first and second elongated members 106, 112, respectively, and then extend downwardly in a generally concave configuration from the second points 107b, 109b to third points 111a, 111b, respectively.

Alternatively, the first and second handle portion 108, 114 may be in the form of other shapes.

Although the first and second gripping portions 110, 116 may be circular in shape having a scalloped outer edge as shown in FIGS. 1-7, in alternative embodiments, one or both of the first and second gripping portions 110, 116 may be a spatula, a fork, a knife or any other kitchen or serving utensil.

The concave or curvilinear shape of the first and second handle members 108, 114 provide surface areas that a user can easily grasp or hold for moving the first and second elongated arms 102, 104 between the open and closed positions. A user may place the first and second gripping portions 110, 116 about an object, such as food, when the first and second elongated arms 102, 104 are in the open position. Next, the user may apply an inward force squeezing the first and second handle members 108, 114 together causing the first and second elongated arms 102, 104 to move to the closed position which in turn causes the first and second gripping portions 110, 116 to come together and grip and/or collect the object. The user may then lift or move the object using the serving utensil 100. In addition to allowing the user to easily operate the serving utensil 100 between the open and closed positions, the user is less likely to hold on to the outer most edges of the serving utensil 100 which are more likely to come into contact with the food.

According to one embodiment, at least one of the handle portions 108, 114 may include an opening (not shown) for receiving fingers of a user allowing the user to easily grasp the serving utensil 100.

The serving utensil 100 may further include a first guard member 126 integrally connected to, and extend perpendicularly outward from, the first elongated arm 102 and a second guard member 128 may be integrally connected to, and extend perpendicularly outward from, the second elongated arm 104. According to one embodiment, the first and second guard members 126, 128 may have a generally triangular configuration. Although a triangular configuration is shown, other polygonal configurations such as square, circular and oval may be utilized. In another embodiment, the first and second guard members 126, 128, may be removable and may be clipped onto any existing serving utensil.

The serving utensil may be made from plastic, metal, carbon fiber, or any other type of material known in the art.

Serving Utensils—One Elongated Arm

Figure 8:
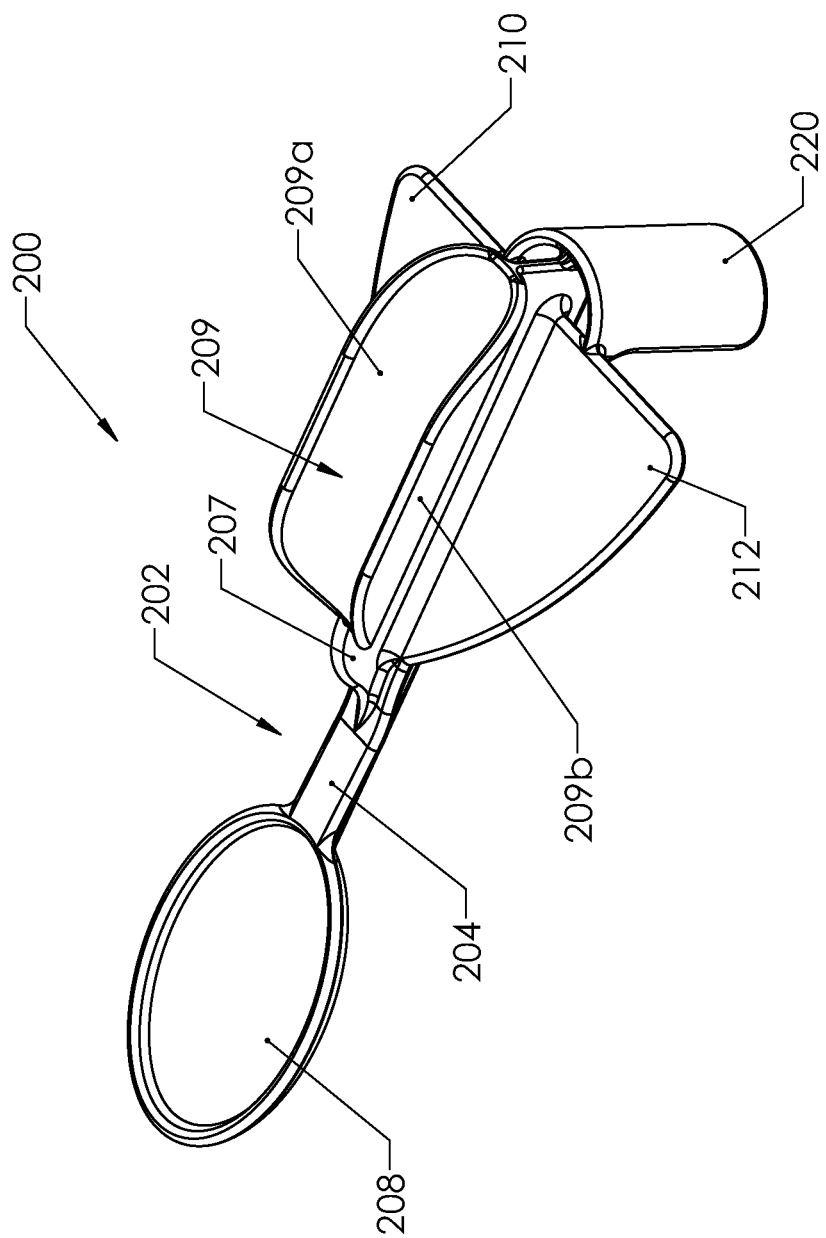
FIG. 8 illustrates a top left side perspective view of a serving utensil in an open position, according to one embodiment.
Figure 9:
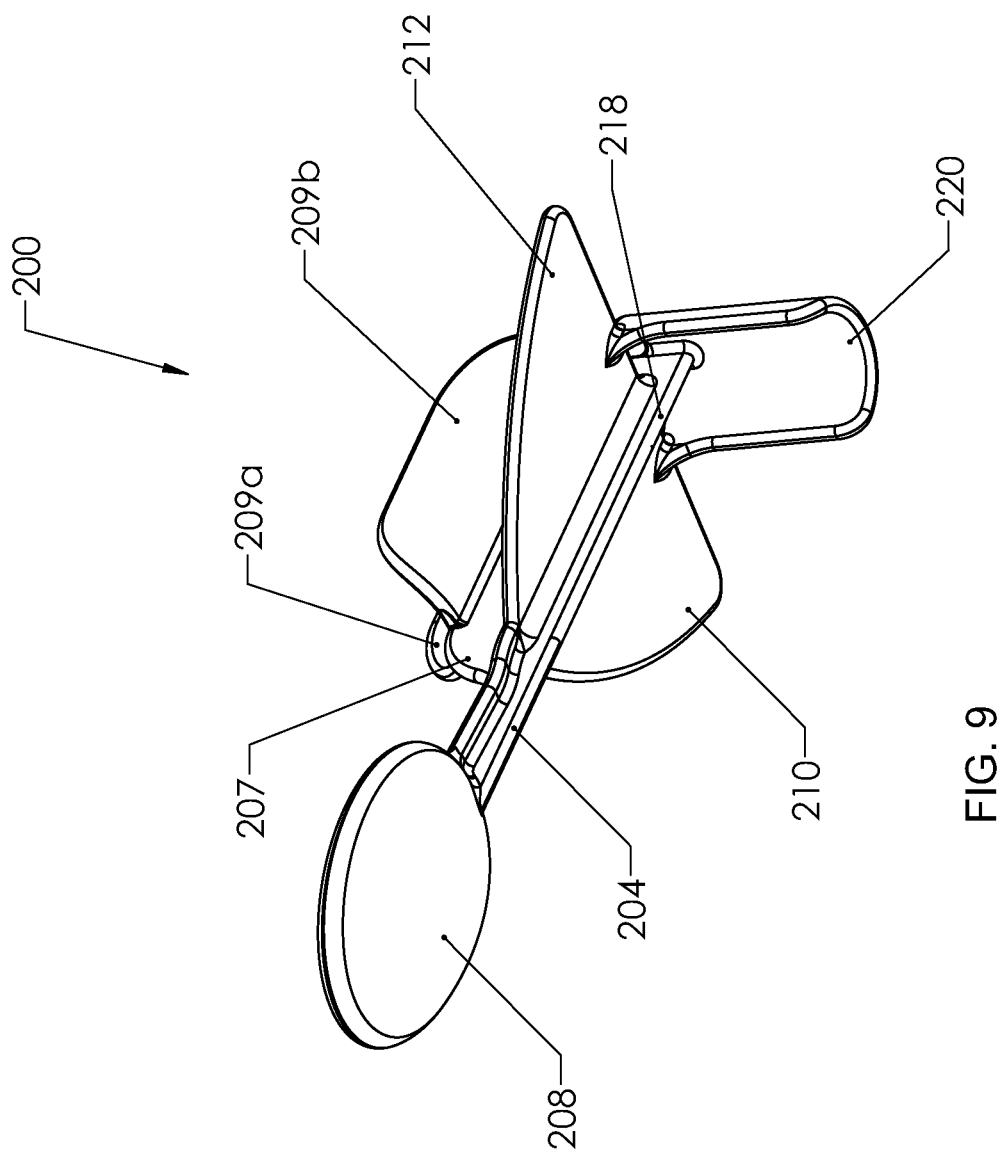
FIG. 9 illustrates a bottom left side perspective view of the serving utensil of FIG. 8.
Figure 10:
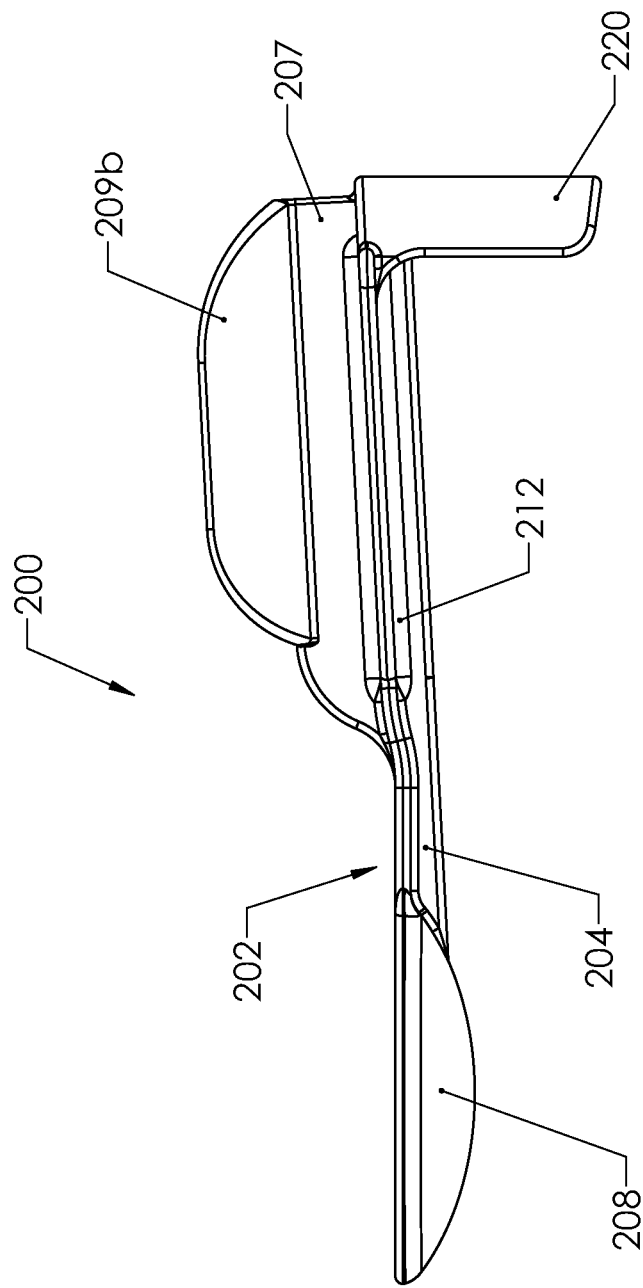
FIG. 10 illustrates a left side elevation view of the serving utensil of FIG. 8.
Figure 11:
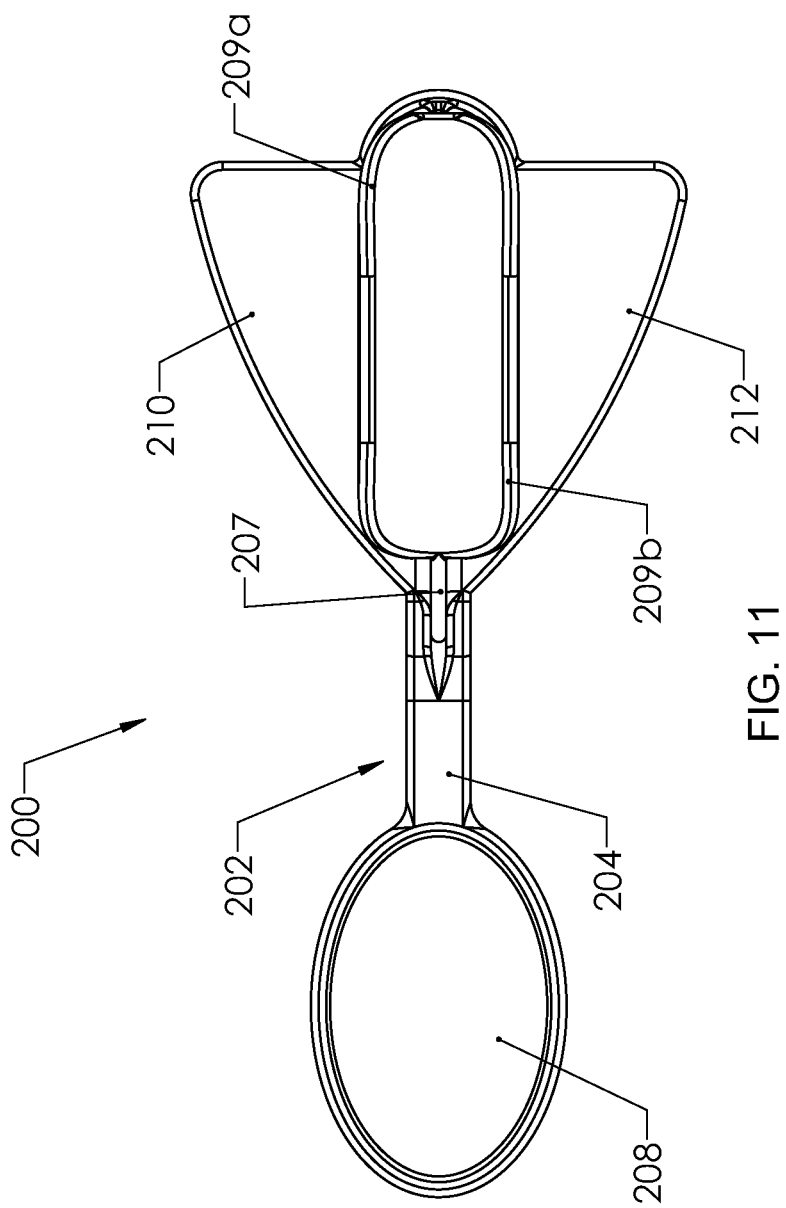
FIG. 11 illustrates a top elevation view of the serving utensil of FIG. 8.
Figure 12:
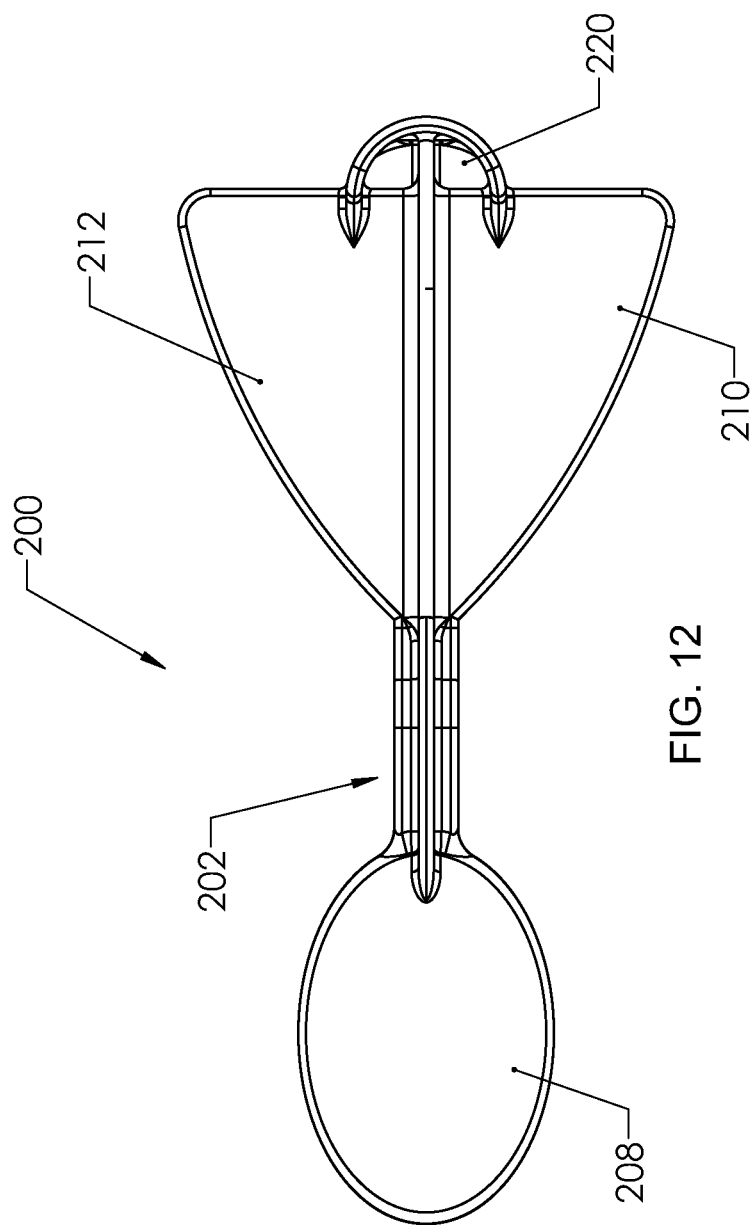
FIG. 12 illustrates a bottom elevation view of the serving utensil of FIG. 8.
Figure 13:
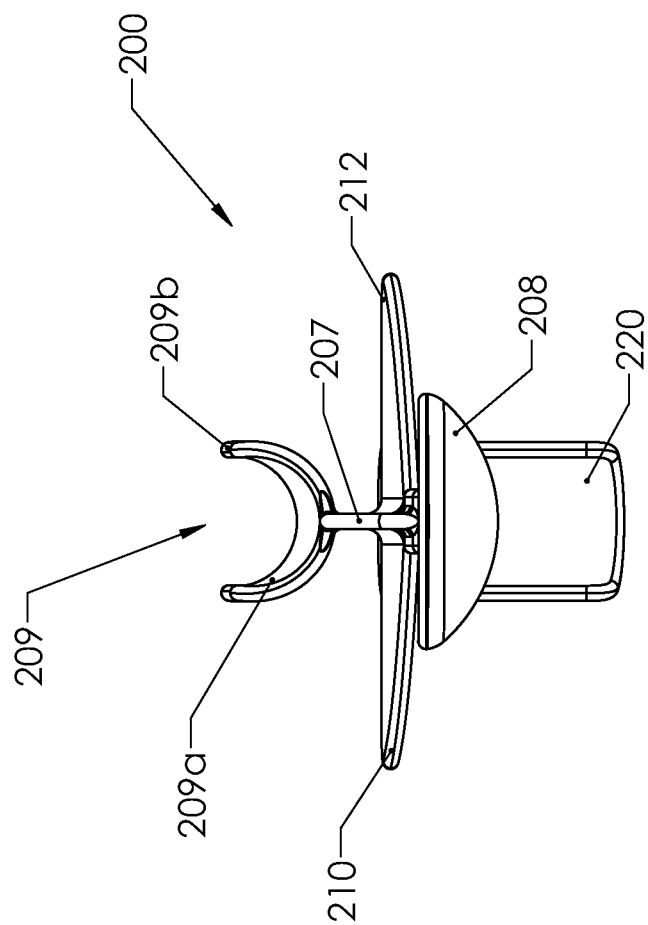
FIG. 13 illustrates a front elevation view of the serving utensil of FIG. 8.
Figure 14:
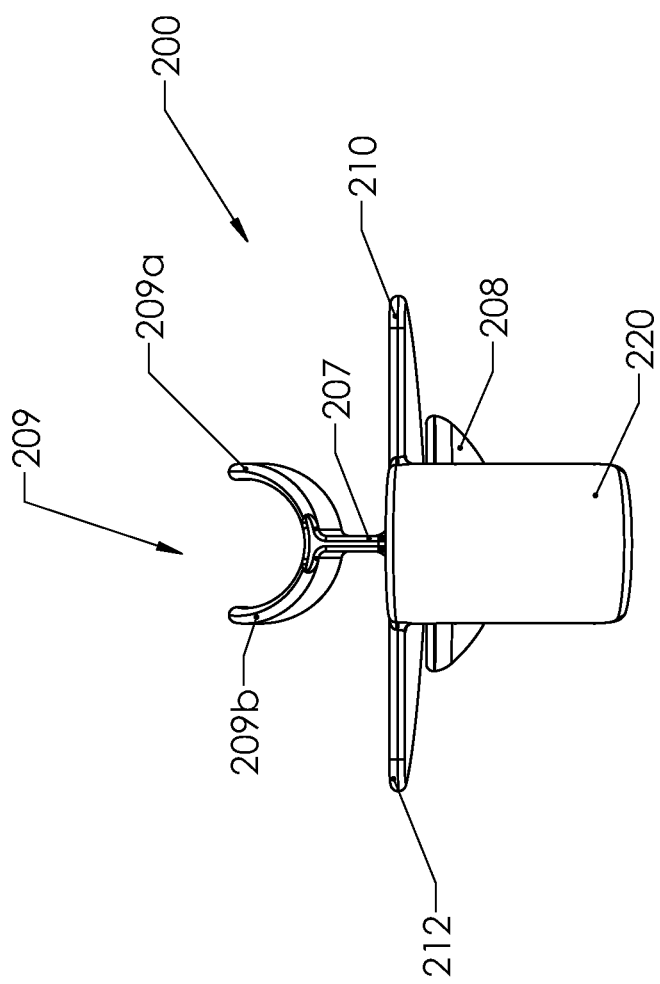
FIG. 14 illustrates a rear elevation view of the serving utensil of FIG. 8.

FIG. 8 illustrates a top left side perspective view of a serving utensil in an open position, according to one embodiment. FIG. 9 illustrates a bottom left side perspective view of the serving utensil of FIG. 8. FIG. 10 illustrates a left side elevation view of the serving utensil of FIG. 8. FIG. 11 illustrates a top elevation view of the serving utensil of FIG. 8. FIG. 12 illustrates a bottom elevation view of the serving utensil of FIG. 8. FIG. 13 illustrates a front elevation view of the serving utensil of FIG. 8. FIG. 14 illustrates a rear elevation view of the serving utensil of FIG. 8. The following discussion refers interchangeably to FIGS. 8-14.

As shown, the serving utensil 200 may include an elongated arm 202, having a proximal end and an opposing distal end. The elongated arm 202 may comprise an elongated member 204 integrally connected to a handle at its proximal end and a serving portion 208 at its distal end. The handle may include a base handle portion 207, having a generally rectangular shape, extending perpendicularly upward from the elongated member 204 and a concave or curvilinear handle portion 209. Although a rectangular configuration is shown, other polygonal configurations such as square, circular and oval may be utilized. The handle portion 209 may include a first arm member 209a extending outwardly and upwardly from the base handle portion 207 and a second arm member 209b extending outwardly and upwardly from the base handle portion 207. According to one embodiment, the first arm member 209a may be integrally connected to or formed into the second arm member 209b forming a single component. The first and second arm members 209a, 209b may have generally concave or curvilinear shapes and provide surface areas that a user can easily grasp or hold. According to one embodiment, the first arm member 209a may be a mirror image of the second arm member 209b. Alternatively, the first and second arm members 209a, 209b may be in the form of other shapes.

Although the serving portion 208 is shown having a generally oval configuration to illustrate a spoon or scoop for moving or removing items, such as food from a serving dish, this is by way of example only. The serving portion 208 may be a spatula, a fork, a knife or any other kitchen or serving utensil.

The serving utensil 200 may further include a first guard member 210 integrally connected to, and extend perpendicularly outward from, a first side of the elongated arm 202 and a second guard member 212 may be integrally connected to, and extend perpendicularly outward from, a second side of the elongated arm 204 where the second side is opposite the first side. According to one embodiment, the first and second guard members 210, 212 may have a generally triangular configuration. Although a triangular configuration is shown other polygonal configurations such as square, circular and oval may be utilized. In another embodiment, the first and second guard members 210, 212, may be removable and may be clipped onto any existing serving utensil.

As the fingers of the user grasp the first and second arm members 209a, 209b, the fingers are prevented from coming into contact with the objects being picked up, such as food, by the first and second guard members 210, 212.

According to one embodiment, the serving utensil 200 may include an attachment member 220 attached to, and extending downwardly from, the first and second guard members 210, 212 at the proximal end of the elongated arm 202. The attachment member 220 may extend perpendicularly downward and may be used to engage with an outer edge of a serving container. According to one embodiment, the attachment member 220 may a generally curvilinear shape. Alternatively, the attachment member 220 may be in the form of other shapes.

The serving utensil may be made from plastic, metal, carbon fiber or any other type of material known in the art.

One or more of the components and functions illustrated in FIGS. 1-14 may be rearranged and/or combined into a single component or embodied in several components without departing from the invention. Additional elements or components may also be added without departing from the invention.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

The invention claimed is:

1. A serving utensil, comprising:
   a first elongated arm including a first elongated member, having a first proximal end and a first distal end, a first gripping portion connected to the first distal end of the first elongated member and a first handle portion extending upwardly from the first proximal end of the first elongated member;
   a second elongated arm including a second elongated member, having a second proximal end and a second distal end, a second gripping portion connected to the second distal end of the second elongated member and a second handle portion extending upwardly from the second proximal end of the second elongated member;
   a first guard member integrally connected to, and extending perpendicularly outward from, the first elongated member below the first handle portion; and
   a second guard member integrally connected to, and extending perpendicularly outward from, the second elongated member below the second handle portion;
   wherein the first proximal end of the first elongated member is integrally connected to the second proximal end of the second elongated member forming a hinge member allowing the first elongated arm and the second elongated arm to be operable between a first, open position and a second, closed position;
   wherein the first handle portion extends upwardly relative to the first guard member and the second handle portion extends upwardly relative to the second guard member when the first and second guard members are oriented in a horizontal plane.

2. The serving utensil of claim 1, wherein the first handle portion has a curvilinear shape; wherein the second handle portion has a curvilinear shape.

3. The serving utensil of claim 2, wherein the first handle portion is a mirror image of the second handle portion.

4. The serving utensil of claim 1, wherein the hinge member extends downwards below the first and second elongated members.

5. The serving utensil of claim 1, wherein the first elongated member includes an upper edge and an opposing lower edge; wherein the upper edge is linear and the lower edge is linear from a first point to a second point and concave from the second point to a third point.

6. The serving utensil of claim 1, wherein the second elongated member includes an upper edge and an opposing lower edge; wherein the upper edge is linear and the lower edge is linear from a first point to a second point and concave from the second point to a third point.

7. The serving utensil of claim 1, wherein the first and second guard members have a triangular shape.

8. The serving utensil of claim 1, wherein the elongated member is made of a material selected from at least one of plastic, metal and carbon fiber.

9. A serving utensil, comprising:
   an elongated arm including an elongated member, having a proximal end and a distal end, a serving portion connected to the distal end of the elongated member and a handle extending upwardly from the proximal end of the elongated member;
   a first planar guard member integrally connected to, and extending perpendicularly outward from, a first side of the elongated member, the first planar guard member located in a horizontal plane; and
   a second planar guard member integrally connected to, and extending perpendicularly outward from, a second side of the elongated member, the second planar guard member located in the horizontal plane.

10. The serving utensil of claim 9, wherein the handle comprises:
    a base handle portion extending perpendicularly upward from the elongated member;
    a first arm member extending outwardly and upwardly from a first side of the base handle portion; and
    a second arm member extending outwardly and upwardly from a second side of the base handle portion.

11. The serving utensil of claim 10, where the first arm member and the second arm member have a curvilinear shape.

12. The serving utensil of claim 11, wherein the first arm member is a mirror image of the second arm member.

13. The serving utensil of claim 10, wherein the first arm member is integrally formed into the second arm member forming a single component.

14. The serving utensil of claim 9, further comprising an attachment member extending downwardly from the first and second guard members at the proximal end of the elongated arm.

15. The serving utensil of claim 9, wherein the first and second guard members have a triangular shape.

16. The serving utensil of claim 15, wherein the first guard member is a mirror image of the second guard member.

17. The serving utensil of claim 9, wherein the serving portion is selected from at least one of a spoon, a fork, knife and spatula.

18. A serving utensil, comprising:
    an elongated arm including an elongated member, having a proximal end and a distal end, a serving portion connected to the distal end of the elongated member and a handle extending upwardly from the proximal end of the elongated member;
    a first guard member integrally connected to, and extending perpendicularly outward from, a first side of the elongated member;
    a second guard member integrally connected to, and extending perpendicularly outward from, a second side of the elongated member; and
    an attachment member extending downwardly from the first and second guard members at the proximal end of the elongated arm.

* * * * *